United States Patent Office 3,832,165
Patented Aug. 27, 1974

3,832,165
PROCESS FOR RECOVERING MANGANESE FROM ITS ORE
William S. Kane, Wicomic, and Paul H. Cardwell, Zanoni, Va., assignors to Deepsea Ventures, Inc.
Filed Feb. 28, 1973, Ser. No. 336,547
Int. Cl. C22b 47/00
U.S. Cl. 75—80                     19 Claims

ABSTRACT OF THE DISCLOSURE

This invention provides a process for obtaining high purity manganese, in the molten state, from manganese oxide ores containing iron. The process comprises halidating the ore with a hydrogen halide and leaching to obtain a leach solution comprising manganous and ferric halides and the elemental halogen; extracting the ferric halide from the solution; separating anhydrous manganese halide from the solution; reducing the anhydrous manganese halide in the molten state with aluminum to form molten manganese metal and aluminum halide; reacting the aluminum halide with water vapor to form hydrogen halide and aluminum oxide; and recycling the hydrogen halide.

Usually, where the ore also contains a nonferrous metal more noble than manganese, the halide of such nonferrous metal is removed from the leach solution, after the ferric halide is removed, by precipitation.

---

Manganese is often obtained from manganiferous oxidic ores, where the metal values are present as oxygen compounds especially the e.g. manganese dioxide. Often, these manganiferous ores include relatively large proportions of iron compounds as well as other metals in generally much smaller quantities, e.g., less than one percent by weight of nickel, cooper, cobalt, zinc and lead.

Processes for refining ores, containing divalent manganese in an oxide compound e.g. MnO or $MnSiO_3$, to win the metal have included chloridating of the ore by reaction with a metal chloride generally an alkali metal chloride or an alkaline earth metal chloride, to form the corresponding manganous chloride. Manganous chloride is generally formed together with an iron chloride; the reacted ore is then leached, the manganese and iron chlorides dissolve and the aqueous solution separated from the remaining insoluble residue. The leach solution is then treated so that the iron is removed, commonly by adding a base, such as calcium hydroxide, to increase the pH to about 3 to 4 to precipitate the iron as the oxide. The oxide is filtered off and additional base can be added to increase the pH to above 8, so as to precipitate manganese hydroxide, e.g. $Mn(OH)_2$. The manganese hydroxide is filtered from the solution and then calcined to form the corresponding oxide. This oxide has then been used as a feed in the production of ferro-manganese in reduction furnaces. A problem with the above procedure, however, is that it is limited to treating ores containing manganese oxides wherein the manganese is in the divalent state. A further difficulty is that the procedure requires filtering the very fine almost gelatinous manganese hydroxide and iron oxide precipitates.

Manganiferous ores have also been refined following other procedures including initially reacting the ore with hydrochloric acid, hydrogen chloride gas, nitrogen dioxide (aqueous solution or dry gas), nitric acid, ammonia-carbon dioxide aqueous leach and treatment with ammonium sulfate. These procedures, however, are limited to ores having a narrow range of manganese-to-iron ratios. For a general summary of various procedures for treating ores to recover manganese, see *Review of Major Proposed Processes for Recovering Manganese from United States Resources*, by Norman and Kirby, (United States Department of the Interior publication, Bureau of Mines, Information Circular 8160, 1963).

Manganese, being a valuable metal has many uses in modern industry: admixture with iron, as in steel, and as alloyed with other metals, such as copper, chromium, nickel and aluminum. The different uses require different minimum degrees of purity. However, an efficient operation resulting in a high purity manganese available in a form which can be utilized for a great many purposes would be extremely valuable and increase the economic potential for the use of manganese metal.

The present invention provides a process for obtaining a high purity manganese metal from even a low grade oxidic manganiferous ore which also contains iron in substantial proportions. The invention further optionally provides a process where those ores that contain more noble nonferrous metals can be processed to obtain other valuable metals which may be present in the ore in minor quantities, such as nickel, copper, cobalt, lead and zinc, in a form from which they can be easily recovered. The process is highly efficient in generating elemental halogen, as a valuable by-product, and in providing for the recycle of that remaining portion of the halide value of the primary reagent which reacts to form the metal halide, i.e., substantially, all of the halide value is either recoverable as the halogen or recycled.

In accordance with the present invention a process is provided for obtaining high purity manganese metal and elemental halogen by treating oxidic manganiferous ores with a hydrogen halide. It is also possible, if desired, to simultaneously process those ores which contain other nonferrous metal values to obtain such other valuable nonferrous metals. Ores which can be usefully treated by this invention comprise primarily compounds of manganese and iron, and preferably, small amounts of other non-ferrous metals such as copper, cobalt, zinc and lead. The process comprises (1) halidating the ore with a hydrogen halide and leaching with an aqueous solution to form the corresponding elemental halogen and an aqueous leach solution of the halides of the metal values present in the ore, including manganous halide and ferric halide, and the halides of any other nonferrous metal which may have been present in the ore; (2) selectively extracting the ferric halide from the aqueous leach solution of the metal halides; (3) separating anhydrous manganese halide from the aqueous solution; (4) reducing the dry manganese halide by contacting the dry manganese halide in the molten condition with aluminum metal to yield manganese metal and vaporous aluminum halide; (5) separating the manganese metal from the reaction mixture; (6) separating the vaporous aluminum halide and reacting with water vapor to form aluminum oxide and hydrogen halide; and (7) recycling the hydrogen halide so formed to halidate the ore.

Preferably, when the ore contains other nonferrous metal values, after extracting the iron, it is necessary to remove from the solution any metals which are more noble than manganese. This can be done by precipitation from the aqueous soltuion and separating the solution from the precipitated metals.

The ore is preferably first comminuted to a particle size of preferably not greater than about 10 mesh on the U.S. sieve scale, and most preferably to a size in the range of from about 35 to about 100 mesh.

Useful halidating agents, therefore, include both the anhydrous hydrogen halides and the aqueous solutions of hydrogen halides, such as hydrogen chloride, hydrogen bromide and hydrogen iodide. The chloride is generally preferred: it is gaseous at normal temperatures, is not overly reactive and thus can be readily handled but yet is sufficiently reactive so as to react at a sufficient rate to produce chlorine gas and the manganese chloride in economical quantities.

The leaching of the ore is carried out substantially simultaneously with the halidation when an aqueous solution of a hydrogen halide is used. Such liquid phase reaction should be carried out at a temperature to maintain a liquid state. This generally, at atmospheric pressure, is from about 0° C. up to about 110° C. It is generally unnecessary and economically expensive to operate below ambient temperature. The preferred temperature is in the range of about 25° to about 110° C.

When anhydrous hydrogen halide is utilized, higher temperatures, up to about 600° C. can be utilized, if desired. However, preferably, temperatures above about 200° C. are unnecessary and not used. The reacted ore is subsequently leached with an aqueous solution. The leaching can be carried out at liquid phase temperatures, i.e., from about 0° C. up to about 110° C. The aqueous solution should have a pH of not greater than about 2.5, and preferably, from about 1.5 to about 2.5 and optimally about 1.8 to about 2.2.

The aqueous leach soltuion obtained by either of the procedures described above, i.e., the reaction between an aqueous hydrogen halide solution and a manganiferous ore, or the reaction using anhydrous hydrogen halide followed by leaching of the reacted ore, contains the desired manganese halide, other nonferrous metal halide impurities which may be present and the ferric halide. The halides formed during the reaction with the aqueous solution of the hydrogen halide are substantially immediately dissolved into the aqueous solution. The aqueous hydrogen halide solution preferably is at least 3 N in the hydrogen halide and must be mixed with the ore at least in a stoichiometric amount to react with the desired metal values, and any of the iron and other, highly reactive, metal values present. Preferably, additional pure hydrogen halide can be added to the solution while it is in contact with the ore, as by bubbling the gaseous hydrogen halide through the liquid. The aqueous leach solution, after reaction with the ore, should have a pH of not greater than about 2.5, in order to keep the ferric halide in solution. Optimally, a pH of not more than about 2 is obtained.

The iron halide must be separated from the manganese halide in the aqueous leach solution. The leach solution can be evaporated to dryness and the crystallized mixed metal halides maintained at about 200° C. in the presence of water to convert iron halide to insoluble iron oxide, and then releached to dissolve the manganese halide. Preferably, however, the aqueous leach solution is extracted with a liquid extracting medium comprising an extracting agent selective to remove the iron halide.

In the preferred method of removing the iron halide the ferric halide is extracted utilizing an extracting agent which is selective to remove ferric halide from an aqueous solution containing the other metal halides formed during the halidation of the ore and from which the ferric halide can be readily stripped. The ferric halide is converted to hydrogen halide and Fe₂O₃ at elevated temperatures. The hydrogen halide is recycled to the halidation reactor and the Fe₂O₃ is separated out. The ferric halide extracting medium is preferably a liquid which is optimally immiscible with water and which selectively extracts ferric halide from a mixture of other metal halides present in the solution. It should be pointed out at this time that the extraction is of the complete ferric halide compound. This is not an ion-exchange situation where the metal ion is chelated or complexed with the chelating agent and the halide ion remains behind. It is necessary in carrying out this procedure that the halide be removed together with the iron into the extractant.

The extracting medium is preferably immiscible with water to improve the economic efficiency of the process. If the extracting medium were not immiscible with water, a substantial loss of the extracting agent would occur during each extraction, by virtue of at least a partial solubility in the water phase and a loss of the extracting agent in the aqueous raffinate.

Extracting agents which are especially suitable because they are highly specific to ferric halides in the mixed halide solutions which are obtained, e.g. from manganiferous ores, include, for example, certain organic amines and organic phosphate esters. These organic phosphate esters and organic amines are specific for the extraction of ferric halides from an aqueous solution comprising ferric halides, copper halides, nickel halides, cobalt halides and manganese halides. These organic amine and organic phosphate ester materials are preferably used in solution in solvents which are immiscible with water.

The organic phosphate esters which can be used for preferentially extracting iron halide include preferably the trialkylphosphates. Such materials have the general formula:

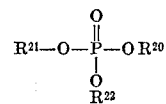

wherein the R groups may be the same or different organic groups, especially hydrocarbon groups and, are optimally alkyl groups, containing from 1 to about 10 carbon atoms, preferably from 2 to 8 and optimally 3 to 6 carbon atoms.

Examples of such materials include tri-n-butyl phosphate, tri-n-hexyl phosphate, n-butyl-di-n-hexyl phosphate, n-propyl-di-n-butyl phosphate, tri-n-propyl phosphate and triamyl phosphate. Esters containing aromatic and cycloaliphatic groups would also be useful in this invention and include triphenyl phosphate, phenyl di(2-ethylhexyl) phosphate and tri(cyclohexyl) phosphate. Tri (n-alkyl) phosphates are most preferred.

The amines which can be used for extracting preferentially iron halide include the primary, secondary, tertiary and quaternary amines. Preferably the amines are aliphatic amines wherein each aliphatic group has from 1 to about 30 carbon atoms; preferably the total number of carbon atoms in the molecule is at least about 12 carbon atoms. Examples of the useful amine extractants include primary aliphatic amines having the formula R—NH₂, wherein R is preferably a tertiary alkyl group having the formula

wherein R¹ contains from about 9 to about 30 and preferably from about 18 to about 24 carbon atoms, and R² and R³ contain from 1 to about 4 carbon atoms, and preferably are methyl groups. Examples of such compounds include N-trialkylmethyl-amines such as N-(1,1-dimethyleicosyl) amine and N-(1,1-dimethyldocosyl) amine.

Preferred secondary amines include compounds having the formula:

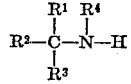

wherein R¹, R² and R³ are defined as above and R⁴ is preferably an alkyl group containing from 1 to about 20 carbon atoms. An example of such a preferred secondary amine is N-lauryl-N-(1,1-dimethyleicosyl) amine, Preferred teriary amines have the formula:

wherein $R^a$, $R^b$ and $R^c$ are alkyl groups, preferably normal alkyl groups each containing from about 5 to about 15 carbon atoms and optimally from about 8 to about 10 carbon atoms; preferred such compounds include tri-(n-octyl)amine, di(n-octyl) - n - hexylamine, di(n-hexyl)-n-octylamine, di(n-octyl) (n-decylamine, di(n-decyl) n-octyl)amine and tri(n-decyl)amine.

Quaternary ammonium compounds can also be utilized as extractants and the preferred such ammonium groups can empirically be defined by the following equation:

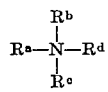

where $R^a$, $R^b$ and $R^c$ are as defined above and $R^d$ is hydrogen or a lower alkyl group containing from 1 to about 4 carbon atoms. Quaternary ammonium groups can be added in the form of any salt, i.e. combined with any anion which is substantially inert in or will not detrimentally interfere with, the process of the present invention. Preferably, the quaternary compound is in the form of a halide and optimally the same halide as is present in the aqueous solution to be extracted. Examples of such preferred quaternary ammonium compounds include tri(n-decyl) methyl ammonium chloride and tri(mixed n-$C_{8-10}$alkyl) methyl ammonium chloride, the latter being derived from a mixture of $C_8$–$C_{10}$ normal paraffinic hydrocarbons.

The above organic amines and organic phosphate esters are compounds generally known to industry and commercially avaliable. Any other amines, esters or other compounds useful as selective extracting agents for ferric halides in the aqueous systems obtained from the halidation of iron-containing ores can also be used in the process of this invention.

As explained above, the extracting agent is preferably a liquid which is itself water-immiscible or is dissolved in a solvent which is substantially immiscible with water.

It has been found when utilizing common commercial water-immsicible solvents that solutions containing from about 2 to about 50 percent by weight and preferably from about 5 to about 30 percent by weight of the phosphate ester and/or amine extracting agents are economically useful as being sufficiently active to remove the ferric halide selectively from the aqueous solution and being sufficiently dilute in the extracting agent so that substantially no extracting agent is leached out and lost in the aqueous raffinate. If it is desired, however, more concentrated solutions can be utilized and even substantially pure amines or phosphate esters can be used. Mixtures of extracting agents can be used as long as they are not jointly reactive and do not interfere with the process of this invention.

Such solvents include generally any inert hydrocarbons which will dissolve the extracting agent, per se, and the ferric halide-extracting agent complex, and which do not react with any of the other materials present under the conditions of the extraction process. Generally, liquid aliphatic, cycloaliphatic, aromatic, cycloaliphatic-aromatic, aliphatic-aromatic or chlorinated such hydrocarbons are preferably utilized as the duiluent-solvents for the ferric halide extracting medium. Optimally, the solvent has specific gravities in the range of from about 0.65 to about 0.95 and a mid-boiling point in the range of from about 120 to 615° F. (ASTM distillation.) However, substantially any liquid can be used as a solvent that meets the following criteria:

(1) A solvent for the ferric halide extracting agents;
(2) A solvent for the extracting agent-ferric halide complex;
(3) Immiscible with water; and
(4) Readily separable from water.

The concentration of the extracting agent in the solvent is determined not only by the solubility of the extracting agent-ferric halide complex. Examples of suitable solvents include benzene, toluene, xylene, aliphatic and aromatic pertroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbons liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

In addition to the solvent and the extracting agent, there can preferably also be present in the liquid extracting medium a phase modifier which prevents formation of an emulsion with, or entrainment of, the organic phase in the aqueous phase. This is accomplished, it is believed, by altering the interfacial tension and related physical properties of the organic-aqueous mixture during extraction. These phase modifiers are generally most useful when an aliphatic solvent is utilized and include, preferably, aliphatic alcohols containing from about 8 to about 16 carbons atoms, such as n-octyl alcohol n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols. Decanol is a preferred material.

Generally no more than the necessary amount of the phase modifier e.g. alcohol, which is necessary to inhibit the formation of the emulsion or prevent entrainment, should be used. Usually no more than about 25% by volume of the phase modifier is necessary. Preferably, from about 2 to about 20% by volume is satisfactory and not more than about 15% is most preferred. The phase modifier can be completely eliminated if desired and, therefore, is optional in the present procedure.

The present invention does not comprise solely the selection of the extracting medium. It is preferred that the extracting medium be a liquid, because liquid-liquid extraction of a normally solid material from solution is a relatively simple and common procedure. However, other extraction procedures can be followed and other types of extractants used.

When utilizing liquid-liquid extraction from an aqueous solution of mixed metal halides, a wide range of aqueous phase-to-aqueous-immiscible-phase volume ratio can be utilized in the present invention. Generally, using a 20% by wt. solution of the amine or phosphate ester, aqueous-immiscible/aqueous phase volume ratios of from about 1:1 to about 5:1 are desirable and most preferable are from about 2:1 to about 4:1; although higher proportions of aqueous immiscible materials can be utilized, it would tend to be wasteful and result in an unnecessarily large volume of liquid being handled.

Temperature is usually not critical to the extraction and generally ambient temperatures can be utilized; preferably, of course, the temperatures should be such as to maintain the aqueous solutions and the extracting medium in the liquid phase under ambient pressure and to maintain the halides and the complex with ferric halide in solution.

The pH of the aqueous solution from which the ferric halide is extracted is preferably not greater than about 2.3, and optimally not greater than about 2.0. The critical point is that at which the ferric halide is hydrolyzed to form iron oxide or iron hydroxide which precipitates out of solution. Accordingly, the pH of the aqueous solution should be not greater than that required to maintain the ferric halide in solution.

The extraction agent must be selective for ferric halide in the particular solution to be extracted based upon the composition of the other metal halides present. That is, the aqueous solution to be treated with the extracting medium in accordance with this invention should contain sufficient ferric halide to be extractable utilizing the extraction agent selected, and the extraction medium should not extract other metal values present, e.g., manganese.

Utilizing the amine or phosphate ester ferric halide extracting agents defined above, the aqueous solution can be saturated substantially in each of the various metal halides commonly associated with iron in manganiferous ores, i.e., nickel, cobalt, copper and manganese.

When a liquid-liquid extraction scheme is utilized, the ferric halide is stripped from the water-immiscible extraction medium by water; preferably, the water is sufficiently acid to prevent the hydrolysis of the ferric halide, and generally a pH of not greater than about 2.3 is maintained. Although the pH can be maintained utilizing any acid, preferably, however, a hydrogen halide acid is preferred; however, other acid anions which are non-interfering with the process of the present invention can also be present and, therefore, materials such as sulfuric acid, nitric acid, etc. can be utilized.

The volume phase ratio of an aqueous stripping liquid to the water-immiscible extraction medium is preferably in the range of from about 1 to 5 to about 1 to 1; however, the best results are obtained when a ratio of stripping liquid to extract phase of at least about 1:4 to about 1:1 is maintained.

Both the extraction of the ferric halide from the aqueous solution of mixed metal halides and the stripping of ferric halide from the water-immiscible extraction medium can be carried out utilizing any conventional contact apparatus. The material can be carried out in a single-stage batch basis or in a continuous flow unit; preferably, in a continuous unit the flow of the two phases is counter-current, such as in a continuous, counter-current mixer-settler unit. The number of stages can be varied as required based on the efficiency of extraction and stripping of the specific materials being treated and of the apparatus being utilized. By adjusting the relative volumes of the aqueous mixed metal halide solution and of the water-immiscible extraction medium, it is possible to obtain a substantially complete removal of ferric halide from the aqueous solution into the organic medium. Similarly by adjusting the ratio of the extraction medium to the aqueous stripping liquid, substantially complete removal of the ferric halide from the extraction medium can be obtained. If there is any residual ferric halide remaining in the extraction medium, it can be recycled together with the extraction medium for further extraction use without interfering with the process of the present invention. Indeed, it is generally assumed that in continuous operation, the extraction medium is stripped and returned for further use to the extraction step with a gradual buildup of ferric halide until an equilibrium level is reached.

Useful apparatus, in addition to mixer-settler units, include for example, packed and plate-type towers, baffled towers and pulse columns, generally also operated countercurrently.

The ferric halide is readily converted to ferric oxide and the corresponding hydrogen halide by evaporation of the water from solution and hydrolysis, e.g., reaction with water and the ferric halide at a temperature of at least 200° C. The vaporous hydrogen halide is readily removed overhead and separated from the ferric oxide solid. The hydrogen halide can then be recycled to the initial halidation stage.

The iron-free aqueous solution, e.g., the aqueous raffinate from the liquid extraction of the ferric halide, can be next treated to precipitate any nonferrous, generally more noble, metals, if any are present, to separate them from the manganese halide. The precipitation can be carried out to obtain the metals in the form of an insoluble compound or in the form of the elemental metal. To obtain the insoluble metal compounds, the aqueous raffinate can be treated with a reagent which has substantially no effect on any manganese present in the aqueous solution but results in the precipitation, as an insoluble compound, of all metals which are more noble than manganese. For example, treating the aqueous raffinate with a soluble sulfide, e.g. bubbling hydrogen sulfide gas through the solution, when the raffinate is at a pH of at least about 6.0, and preferably from about 6.4 to about 6.8, and at a temperature of from about 10 to about 50° C, causes the precipitation of nickel sulfide, zinc sulfide, lead sulfide, copper sulfide and cobalt sulfide, but not of manganese sulfide. The precipitate can be separated from the aqueous solution by conventional liquid-solid separation methods, e.g., filtration or centrifugation. In addition to hydrogen sulfide, other useful precipitating agents include ammonium sulfide and alkali metal sulfides, e.g., sodium sulfide. See *Electrolytic Manganese and Its Alloys*, R. S. Dean and U.S. Pats. Nos. 2,316,750 and 2,347,456.

In the alternative the metals can be precipitated as the elemental metals. This is accomplished by the procedure generally known as "cementation," e.g., passing the aqueous solution in contact with a bed of an active metal which can displace any metal less active than manganese from its halide.

Manganese is a preferred cementing metal. The manganese metal replaces the more nobel metals in the halide compounds, leaving an aqueous solution increased in manganese halide concentration and substantially depleted in the more nobel metals.

The displacement process results in the displacement of all metals lower on the electromotive scale than manganese. As the procedure is carried out in the aqueous phase, generally temperatures of from about 15 to about 100° C. are useful and preferred temperatures are in the range of from about 20 to about 70° C. Unusual circumstances may require the use of a higher temperature in which pressure can be utilized to maintain the solution in the aqueous liquid stage. Similarly, the temperature of the reaction mixture should be maintained above the freezing point of the solution; in the event that the operation is carried out under winter conditions, some heating may be required; although the displacement reaction is exothermic, the amount of heat released may not be sufficient to maintain the reaction if the ambient temperature is, for example, below 0° C.

The aqueous solution effluent from the displacement reaction contains the manganese halide originally present, the halide of the cementing, or displacing metal, and the halides of any metals which are higher on the electromotive scale and which were present originally. Such materials include compounds of magnesium, calcium, strontium, sodium, potassium and barium. The oxides, carbonates and other forms of such metals are often found in the ores and these would be halidated and leached from the ore together with any desirable more noble metal halides. Such metals would not be precipitated as either insoluble compounds, e.g., as sulfides, or as the elemental metals.

The metal halides in the aqueous solution are then crystallized and dried so that they are substantially anhydrous; this is best done by simply evaporating the water from the solution and then drying the crystals to form a mixture of dried particulate solids, primarily comprising the manganese halide obtained from the manganiferous ore. Evaporation can be carried out by either heating the solution to its boiling point or alternatively by vacuum distillation, decreasing pressure so as to cause evaporation of the water at lower pressures and lower temperatures. Generally, a combination of these two procedures is most effective; however, the normal boiling point of the solution is not detrimental to the metal halide compounds.

The preferred process for reducing the manganese halide to metal is one which is not interfered with by the presence of the other metal halides, i.e., alkali metal and alkaline earth metal halides. This procedure provides for the displacement of manganese from the molten manganese halide by aluminum metal. The displacement procedure generally comprises contacting aluminum metal with the molten metal halide to form the corresponding aluminum halide and manganese. The aluminum halide formed is vaporized and readily separated from the molten metal halide and aluminum and manganese metals. The elemental *manganese* can be readily separated from the molten halide. Generally, when carrying out the procedure it is necessary to prevent the vaporization of the manganese halide together with the aluminum halide. Aluminum halide boils at a temperature of below 300° C. In carrying out this procedure, it is necessary to maintain in the molten state, both the manganese halide and the manganese metal that is formed. Therefore, the molten manganese must be maintained at a temperature of about 1260° to 1300° C. at which temperature the manganese halide has a substantial vapor pressure, and is vaporized together with the aluminum halide unless special provisions are made. Such provisions include, at least initially, maintaining a temperature gradient in a pool of the molten halide such that the top of the pool is at a temperature above the melting point of the manganese halide and preferably also of aluminum metal.

The temperature of the molten pool of the manganese halide should increase in a downward direction to a maximum value at the bottom sufficient to maintain manganese metal, or any high melting alloy of manganese and aluminum that may be formed, in the molten or semi-molten condition. Such a gradient can be maintained by applying heat to the bottom of a charge of molten manganese halide when first starting up the process and optimally also decreasing the insulation in the reactor from bottom to top. This prevents the evaporation of the manganese halide from the top of the molten manganese halide but permits maintaining the manganese metal in the molten state at the bottom. Any vaporization, or ebullition that may occur at the bottom of the pool is condensed and absorbed upon passing through the relatively cool upper sections of the reactor.

Generally, in carrying out the procedure, the manganese halide is charged to a reactor and heated to its melting point. Heat is continued to be applied to the bottom of the melt until the bottom is at a temperature of about 1200 to 1300° C. The upper portion of the bath is maintained at a temperature of at least about 700° C., but preferably at least about 900° to about 1150° C. Aluminum metal, preferably in particulate form, is then added, e.g., at the top surface. Upon contacting the manganese halide the aluminum reacts with the halide to displace manganese. The manganese, as it is displaced, immediately alloys with aluminum. The alloy sinks into the halide and as it falls melts and displaces more manganese. The melting point of the aluminum manganese alloy gradually increases with increasing manganese content. A high melting alloy is formed which melts at a temperature near 1300° C. Accordingly, the bottom of the molten pool should be maintained at least about 1300° C., and preferably from about 1300° to about 1500° C.

In a preferred continuous procedure, to a molten pool of the manganese halide (plus any other halides obtained from the ore) are added aluminum metal and additional manganese halide preferably in substantially stoichiometric proportions. This maintains substantially constant the manganese halide pool. The displaced manganese metal gradually settles to the bottom of the reaction pool, forming a layer of molten metal beneath the relatively less dense manganese halide. The metal layer continues to react with the metal halide, at the interface between the metal and manganese halide, until the aluminum is substantially completely reacted. The proportion of aluminum in the melt can be reduced to less than about 0.05% by weight. The molten metal layer can be agitated, as with a mechanical stirrer or by bubbling inert gas therethrough; however, the convection currents created by the heat of reaction are sufficient to maintain contact between the two layers. Molten metal is withdrawn at a rate determined by the aluminum metal addition so as to eventually maintain a steady state in the reaction system.

It must be noted, however, that the reaction is far more efficient during the period that the metal is sinking into the molten halide pool than it is at the interface between the bottom layer of molten metal and the upper pool of halide. Therefore, a deep reactor, having a relatively small diameter, is preferred to a shallow reactor having a relatively wide diameter, for an equal volume pool. The deeper the pool of molten halide, the longer the time during which the aluminum is falling therethrough.

Furthermore, as the reaction is highly exothermic, the rate of aluminum addition also determines the temperature of the reaction mixture; therefore, in order to avoid excessive temperature rise, either additional cooling must be provided or the rate of aluminum addition limited.

When utilizing the dried and crystallized manganese halides obtained from the process of this invention, the molten manganese halide contains impurities, such as alkaline earth metal halides and alkali metal halides, which tend to increase the boiling point of the molten manganese halide. Accordingly, in continuous, steady-state operation, the proportion of these impurities builds up to as much as 50% of the total halide melt. Under these circumstances the vapor pressure of the molten halides at the maximum operating temperature of at least about 1300° C. is sufficiently low that the loss of the manganese halide by vaporization is greatly decreased, or even substantially eliminated.

Accordingly, when the proportions of impurities are great enough, the need for the temperature gradient is substantially eliminated. This will usually occur when steady state operation has been achieved and, therefore, the temperature gradient can at that point be eliminated or at least reduced. If desired, of course, additional impurities can be added to the original melt so that the increased boiling point, and decrease in vapor pressure, is immediately achieved.

To maintain the desired concentration of the impurities in the melt, it is possible to maintain a bleed from the pool of the molten metal halide. The bleed rate is balanced with the feed rate of fresh manganese halide to maintain a substantially constant volume of halide mixture in the reaction vessel and a constant concentration of the impurities in the manganese halide melt.

Generally, particulate aluminum scrap metal is preferably utilized as the feed to this manganese displacement reaction. Materials such as the chips or "turnings" from aluminum fabrication plants, when available, provide a cheap and sighly reactive source of aluminum metal. Preferably, a particle size of not greater than about 4 inches is preferred for the aluminum metal. A particle size of not greater than about ¼ in. is preferred for the additional halide feed.

The preferred proportion of vapor pressure-reducing impurity in the molten manganese halide, such as the alkaline earth metal halides or alkali metal halides, is not greater than about 90 percent by weight of the total salts, and preferably not greater than about 60 percent by weight. Generally, the amount of impurity desired is the minimum necessary to maintain the vapor pressure sufficiently low at the reaction temperature so that the loss of manganese halide is effectively repressed.

The displacement reaction of aluminum for manganese in manganese halide is especially effective for providing a high grade, bulk manganese metal ingot. The molten manganese formed can be cast into an ingot of any desired size. In order to maintain the advantage of this procedure, however, it is important to prevent the addition of any oxides with the aluminum metal or with the metal halide feed, and to exclude oxygen from the system. The presence of oxides will cause a slagging on the top surface of the molten halide and, more importantly, cause the formation of oxide impurities in the manganese metal, thus obviating the advantages of this procedure over reduction systems beginning with a manganese oxide compound. Accordingly, the atomsphere above the molten manganese halide should be free of oxygen. An inert gas blanket is formed at the initiation of the reaction; in a continuous process, the aluminum halide, which is continuously evolved from the reaction mixture, displaces the inert gas to form an atmosphere of aluminum halide vapor over the reaction melt.

As the reaction progresses, there is a gradual buildup of molten metal at the bottom of the reaction vessel. The metal can be tapped at a rate to maintain a residence time in the reaction vessel sufficient to form a layer of molten metal at the bottom of the pool substantially depleted in aluminum. The total residence time is a factor not only of temperature and the condition of the aluminum metal, but also of the height of the metal halide pool, which determines the time during which the aluminum falls through the pool. The period during which the aluminum falls is the period of greatest reaction efficiency. Therefore tall narrow pools of the molten metal halide are more efficient than short wide pools of equal volume. Similarly, the greater the density of the metal halide, the longer is the period of fall. The maximum residence time is determined by economic considerations only, the longer the time the less aluminum remaining in the manganese metal.

The aluminum halide vaporized from the molten bath and drawn off is preferably passed over the aluminum prior to its being injected into the molten bath. This permits the preheating of the aluminum metal by the hot gases and the recovery by condensation of any manganese halide which may have been carried out by the aluminum halide. The condensed manganese halide is added together with the aluminum metal charged to the molten reaction material and thus substantially no manganese halide is lost.

The aluminum halide removed from the reactor is contacted with water vapor at a temperature of at least about 500° C., and preferably at least about 100° C. and optimally in the range of from about 150 to about 400° C. to form hydrogen halide vapor and aluminum oxide ($Al_2O_3$). The hydrogen halide vapor can then be dissolved in water to form an aqueous hydrogen halide solution, if desired, or recycled in the vapor stage to be used in the halidation of the ore. Preferably, and most simply, the hydrogen halide is condensed as an aqueous solution and the solution then recycled to the halidation reaction of the ore.

Thus, when utilizing a hydrogen halide, in the halidation reaction with the manganese dioxide ore, the process of this invention results in the formation of elemental halogen as a valuable by-product. The portion of the hydrogen halide which is not converted to the halogen can be substantially reclaimed.

Figure 1:
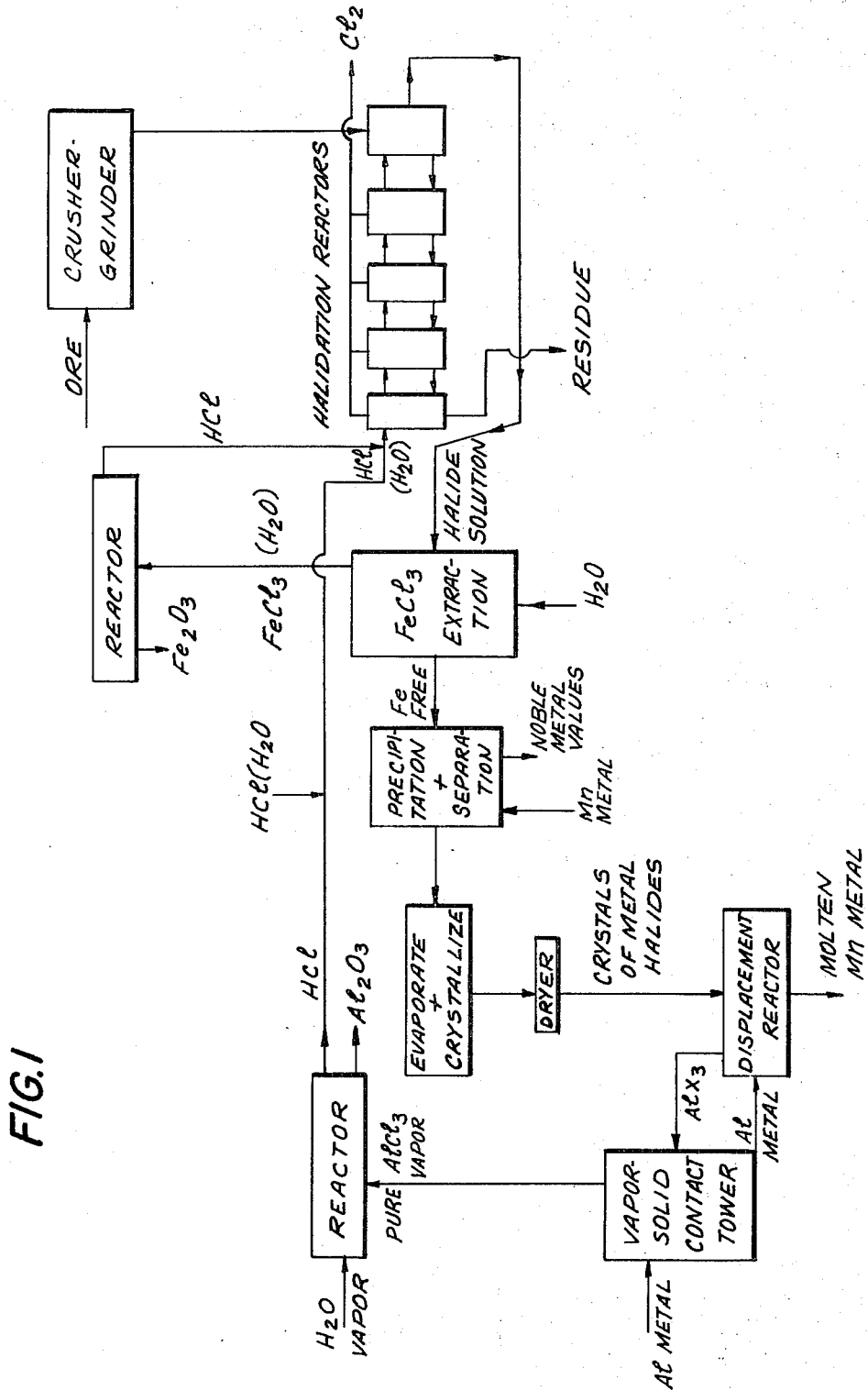
FIG. 1 is a schematic flow diagram for a preferred process in accordance with this invention utilizing aqueous hydrogen halide as the halidation reagent.

Referring to FIG. 1, a manganiferous ore is crushed to a particle size of not greater than about 35 mesh, U.S. sieve scale. The crushed ore then passes to the five-stage halidation reactor, where it is contacted countercurrently with an aqueous hydrogen halide solution, e.g., initial concentration 11N HCl. The halogen, e.g., chlorine, by-product is vented from each stage. Additional hydrogen halide gas can be added to one or more of the stages, if desired. The aqueous leach solution leaving the final stage has a pH of from 1-2 and contains dissolved, the soluble metal chlorides extracted from the ore.

The leach solution is next treated to an $FeCl_3$-extraction process which comprises being passed through 4 mixer-settler stages countercurrently to an organic solution of an amine extracting medium, e.g., comprising 15% by volume of N-lauryl-N-(1,1-dimethyl-eicosyl)-amine,

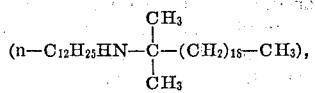

15% by volume isodecanol, in kerosene solvent, at an aqueous-to-organic ratio of e.g., 1:4 by volume.

The organic extract is then stripped with water, having a pH of 2, in a countercurrent, e.g., three-stage, mixer-settler system at an organic-to-aqueous ratio of, e.g., 4:1 by volume. The stripping solution is then passed to the $FeCl_3$ reactor, where the solution is evaporated, heated to a temperature of about 200° C. to form HCl and $Fe_2O_3$. The HCl is passed to the halidation reactor.

The iron-free raffinate from the ferric halide extracting step is then passed over a bed of particulate manganese metal having a particle size not greater than about ¼ inch. The noble metal values are precipitated as the elemental metal on the manganese bed and manganese metal substitutes for the more noble metals in the halides, forming a solution more concentrated in manganese halide. Any of the halides of the less noble metals present, such as the alkali metal halides or the alkaline earth metal halides, are not affected by this displacement treatment. The noble metal values precipitated in the bed of manganese metal can then be dissolved, as by an ammonium carbamate solution, such as is described in German Patent Specification No. 2,152,696 and then further treated to separate and purify the individual valuable metals obtained thereby.

The aqueous effluent from the metal precipitation step comprises manganese halide and usually also one or more alkali metal halides and alkaline earth metal halides. The effluent is next heated to crystallize the manganese halide tetrahydrate together with some of the other halides present.

Figure 2:
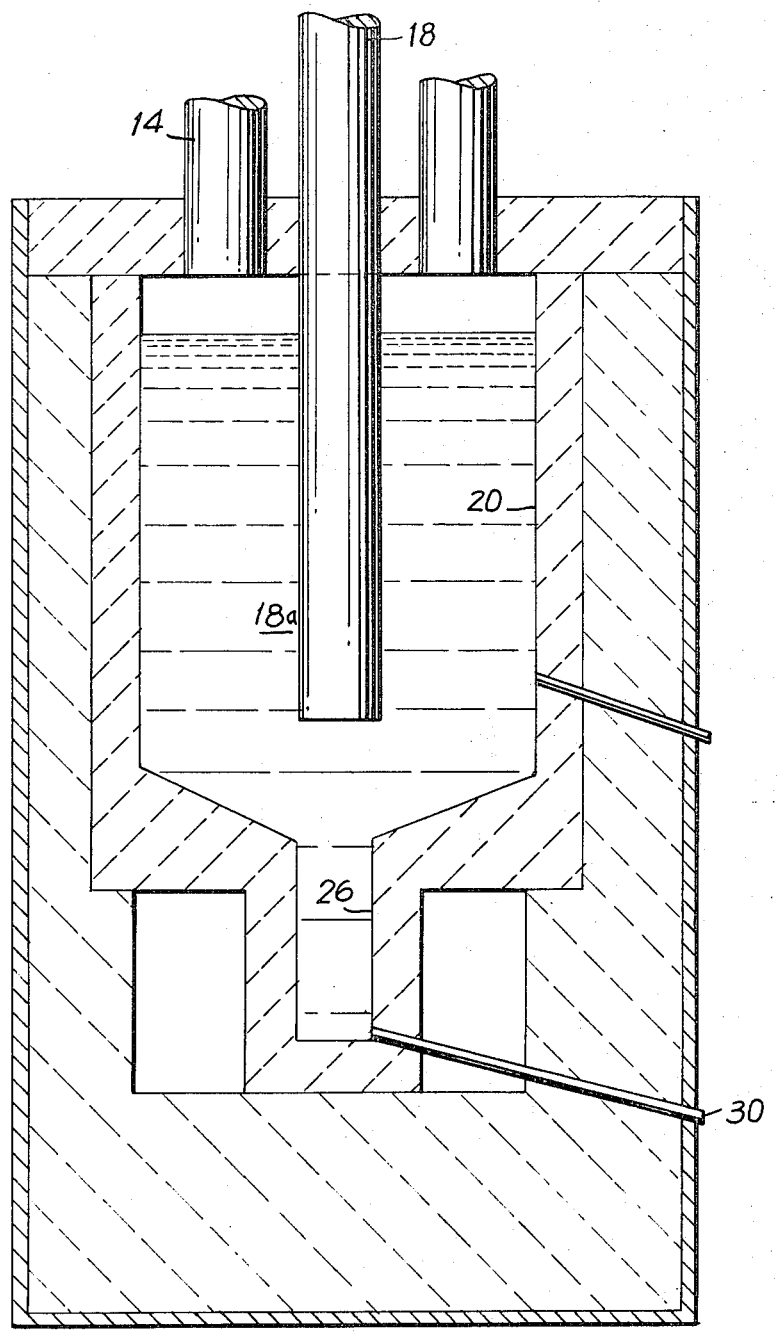
FIG. 2 is a sectioned elevation view of the reactor vessel suitable for use in the displacement of manganese from manganese halide by aluminum.

The crystals are dried and added to a reaction vessel having a refractory lining, 20, as shown in FIG. 2, comprising a pool of molten halides (comprising about 50% manganese halide), wherein the top of the pool has a temperature of 1150° C. and the bottom, 1300° C. A substantially stoichiometric amount of scrap aluminum turnings is added with the additional manganese halide through feed conduit 18 and 18a. Molten manganese metal is tapped from the bottom layer of metal, in the narrow neck portion, 26 through liquid outlet port, 30 and aluminum halide vapor removed overhead through vapor outlet, 14.

The aluminum halide vapor is passed through a contact tower with the aluminum scrap to preheat the aluminum and to recover any manganese halide carried out. The manganese halide is returned to the reactor. The temperature in the tower is maintained at above the boiling point of the aluminum halide.

The aluminum halide vapor is then passed into a reactor in contact with water vapor, at a temperature of at least about 400° C. Aluminum oxide is removed as a by-product and the hydrogen halide is recycled to the halidation reactor.

The patentable embodiments of this invention which are claimed are as follows:

1. A process for the preparation of molten manganese metal from a manganese oxide ore, the ore comprising tetravalent manganese and iron, the process comprises (1) halidating the ore with a hydrogen halide and leaching with an aqueous solution to form the corresponding elemental halogen and an aqueous leach solution comprising the halides of divalent manganese and of trivalent iron; (2) selectively extracting the ferric halide from the aqueous leach solution; (3) separating substantially anhydrous manganese halide from the aqueous solution;

(4) contacting the anhydrous manganese halide, in the molten state, with aluminum metal to form molten manganese metal, and aluminum halide vapor; (5) reacting the aluminum halide with water vapor to form aluminum oxide and hydrogen halide; and (6) recycling the hydrogen halide so formed to halidate additional ore.

2. The process of Claim 1 wherein the ore also comprises a nonferrous metal relatively more noble than manganese and wherein the process comprises, in addition, after extracting the ferric halide, removing from the aqueous leach solution the nonferrous metal by precipitating the nonferrous metal and separating the solid precipitate from the aqueous solution.

3. The process of Claim 1 wherein ore is halidated with an aqueous solution of a hydrogen halide and wherein the metal halides formed are leached out by the solution.

4. The process of Claim 1 wherein the ore is halidated with anhydrous hydrogen halide at a temperature of from about 0° to about 600° C. and the halidated ore is then leached with an acidic aqueous solution at a temperature of from about 0° to about 110° C.

5. A process for the preparation of molten manganese metal from a manganese oxide ore, the ore comprising tetravalent manganese and iron, the process comprising (1) contacting the manganese oxide ore with aqueous hydrogen halide to form an aqueous solution comprising the halides of manganese and iron, and the elemental halogen; (2) separating the aqueous solution from any insoluble ore residue; (3) contacting the aqueous solution with an extracting medium capable of selectively extracting ferric halide from the aqueous solution; (4) separating the aqueous raffinate, depleted in ferric halide, from the extraction medium; rich in ferric halide; (5) separating anhydrous manganese halide from the aqueous solution; (6) contacting the manganese halide in a molten state with aluminum metal at an elevated temperature so as to form a molten reaction mixture comprising manganese metal and manganese halide and aluminum halide vapor; (7) separating molten manganese metal from the molten reaction mixture; (8) separating the aluminum halide vapor from the molten reaction mixture; (9) contacting the aluminum halide with water at a temperature of at least about 200° C. to form aluminum oxide and hydrogen halide; and (10) recycling the hydrogen halide to contact additional manganese ore.

6. The process of Claim 5 wherein the ore comprises, in addition, a nonferrous metal relatively more noble than manganese, and wherein the process comprises, in addition, after separating the aqueous raffinate depleted in ferric halide, precipitating the nonferrous metal from the aqueous raffinate solution and separating the insoluble precipitate from the aqueous solution.

7. The process of Claim 6 wherein the nonferrous metal value is precipitated from the aqueous raffinate solution by contacting the aqueous solution with elemental manganese metal to displace the more noble nonferrous metal and separating the thus formed solid elemental nonferrous metal from the aqueous solution comprising manganese halide.

8. The process of Claim 5 wherein the extracting medium is a water-immiscible liquid.

9. The process of Claim 8 wherein the water-immiscible liquid comprises a solution of an agent, capable of extracting selectively ferric halide from an aqueous solution comprising also manganese halide, in a solvent for the extracting agent which is immiscible with water.

10. The process of Claim 9 wherein the extracting medium comprises a liquid solution of an organic phosphate ester or of an alkylamine in a water-immiscible organic solvent.

11. The process of Claim 5 wherein the product of the halidation comprises manganese halide, ferric halide, and a halide of at least one relatively more noble nonferrous metal selected from the group consisting of nickel, cobalt, copper, lead and zinc.

12. The process of Claim 5, wherein the ore is contacted with the hydrogen halide at a temperature of from about 10° to about 110° C.

13. The process of Claim 5 comprising comminuting the ore before contacting with the hydrogen halide.

14. The process of Claim 5, wherein the molten manganese halide is formed in a pool having a vertical temperature gradient, wherein the temperature increases towards the bottom, and wherein the aluminum metal is added to the pool of molten manganese halide.

15. The process of Claim 5 wherein the molten manganese halide also contains an impurity selected from the group consisting of alkali metal halides and alkaline earth metal halides in an amount sufficient to decrease the vapor pressure of the molten manganese halide.

16. The process of Claim 5 comprising contacting the extracting medium rich in ferric halide with water, to strip ferric halide from the extracting medium; separating the ferric halide-rich aqueous solution from the ferric halide-depleted extracting medium, recycling the extracting medium for further extraction duty, converting the ferric halide to ferric oxide and hydrogen halide, and recycling the hydrogen halide to contact the ore.

17. The process of Claim 5 wherein the hydrogen halide is hydrogen chloride.

18. A process for the preparation of molten manganese metal from a manganese oxide ore, the ore comprising tetravalent manganese and iron and nonferrous metal relatively more noble than manganese, the process comprising:

1. contacting the manganese oxide ore with aqueous hydrogen chloride to form an aqueous solution comprising manganous chloride, ferric chloride, and a chloride of the nonferrous metal and chlorine;
2. separating the aqueous solution from any insoluble ore residue and gaseous chlorine;
3. contacting the aqueous solution with an extracting medium capable of selectively extracting ferric chloride from the aqueous solution;
4. separating the aqueous raffinate, depleted in ferric chloride, from the extracting medium, rich in ferric chloride;
5. contacting the extracting medium, rich in ferric chloride, with water to strip the ferric chloride from the extracting medium;
6. separating the ferric chloride rich aqueous solution from the extracting medium depleted in ferric chloride;
7. converting the ferric chloride to ferric oxide and hydrogen chloride and recycling the hydrogen chloride to contact additional ore;
8. contacting the aqueous raffinate solution with manganese metal to precipitate as the elemental metal the more noble nonferrous metal from the aqueous raffinate solution and separating the elemental metal from the aqueous solution;
9. separating anhydrous manganous chloride from the aqueous solution;
10. adding the anhydrous manganous halide together with a substantially stiochiometric amount of aluminum metal to a molten pool of manganese halide to form manganese metal and aluminum halide vapor;
11. separating molten manganese metal from the molten pool;
12. separating aluminum chloride vapor from the molten pool;
13. contacting the aluminum chloride with water vapor at a temperature of at least about 200° C to form aluminum oxide and hydrogen chloride; and
14. recycling the hydrogen chloride to contact the manganese oxide ore.

19. The process of claim 1 wherein the hydrogen halide is hydrogen chloride.

References Cited

UNITED STATES PATENTS 2,658,813—11/1953—Whitehouse et al. _____ 75—80
2,709,131— 5/1955—Marshall _____ 75—21
3,197,274— 7/1965—White _____ 75—121
3,251,646— 5/1966—Alon et al. _____ 75—121
3,409,415—11/1968—Moore et al. _____ 75—121
3,723,095— 3/1973—Skarbo _____ 75—117

FOREIGN PATENTS 560,121— 7/1958—Canada _____ 75—114

L. DEWAYNE RUTLEDGE, Primary Examiner

M. J. ANDREWS, Assistant Examiner

U.S. Cl X.R.

75—114, 113, 117, 119, 120